US009052983B2

(12) United States Patent
Farchi et al.

(10) Patent No.: US 9,052,983 B2
(45) Date of Patent: Jun. 9, 2015

(54) SOURCE CODE PATCHES

(75) Inventors: Eitan Daniel Farchi, Pardes Hana (IL); Abel Gordon, Haifa (IL); Nadav Yosef Har'El, Misgav (IL); Moran Shochat, Zichron Ya'akov (IL)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 13/350,841

(22) Filed: Jan. 16, 2012

(65) Prior Publication Data

US 2013/0185697 A1    Jul. 18, 2013

(51) Int. Cl.
*G06F 9/44*    (2006.01)

(52) U.S. Cl.
CPC ........................ *G06F 8/71* (2013.01)

(58) Field of Classification Search
CPC .......................................... G06F 8/71
USPC .......................................... 717/113
See application file for complete search history.

(56) References Cited

U.S. PATENT DOCUMENTS

| | | | |
|---|---|---|---|
| 6,466,999 B1 * | 10/2002 | Sliger et al. ..................... 710/68 |
| 2003/0163801 A1 * | 8/2003 | Thames et al. ................. 717/123 |
| 2004/0177343 A1 * | 9/2004 | McVoy et al. .................. 717/122 |
| 2007/0220479 A1 | 9/2007 | Hughes |
| 2008/0229282 A1 * | 9/2008 | deVries et al. ................. 717/122 |
| 2009/0271768 A1 * | 10/2009 | Goodson ......................... 717/125 |
| 2010/0115502 A1 * | 5/2010 | Jiva et al. ....................... 717/148 |
| 2010/0169874 A1 * | 7/2010 | Izard et al. ..................... 717/170 |
| 2012/0179898 A1 * | 7/2012 | Betouin et al. ................. 712/227 |
| 2013/0185696 A1 * | 7/2013 | Farchi et al. ................... 717/110 |
| 2013/0185697 A1 * | 7/2013 | Farchi et al. ................... 717/113 |

OTHER PUBLICATIONS

Borho et al., TortoiseHg v2.0.0 documentation 7. Patches (2011) retrieved from http://tortoisehg.bitbucket.org/manual/2.0/patches. html on Sep. 20, 2014.*
Wikipedia, The free encyclopedia, "patch (Unix)", Sep. 2011. URL:// http://en.wikipedia.org/wiki/Patch_%28Unix%29.

* cited by examiner

*Primary Examiner* — Don Wong
*Assistant Examiner* — Theodore Hebert
(74) *Attorney, Agent, or Firm* — Riv Glazberg

(57) ABSTRACT

Apparatus, process and product useful for source code patches. The computerized apparatus having a processor, the apparatus comprising: a source code obtainer for obtaining a source code of a computer program; a patch instructions obtainer for obtaining a set of source code patches instructions, wherein a first patch instructions comprise a set of modification instructions to the source code associated with a first source code patch, wherein a second patch instructions comprise a set of modification instruction to the source code associated with a second source code patch; a source code editor configured to display to a user the source code and annotations associated with applying each source code patch simultaneously; and wherein said source code editor is further configured to edit the source code in accordance with user input, wherein based on user input the first and second source code patch instructions are modified.

20 Claims, 4 Drawing Sheets

SOURCE CODE PATCHES

TECHNICAL FIELD

The present disclosure relates generally to computer programming and, more particularly to source code patches.

BACKGROUND

A lot of software development is done using an iterative modify-review process. A developer modifies the source code—e.g., fixes a bug or adds a new feature. However, this modification cannot go into the project immediately—before it can be accepted, the modification needs to be reviewed—by the whole team or by one of more managers of the project.

In certain organizations, face-to-face reviews, where the developer presents his code to the reviewers, are possible. In many other organizations, however, the developers are spread across countries and time zones, or simply find it difficult to is coordinate a meeting, and the review is carried out from a distance, such as via email: the developer packages his proposed source-code modification in a patch file and sends this change information to the reviewers. Specifically, this procedure is common in peer-production models, such as open source development.

A "source code patch", or "patch", in the present disclosure is a set of modifications instructions to the source code that are conceptually associated, such as all modifications are aimed to a common goal such as to adding a feature or resolving an existing bug. A patch may be provided as a text file, such as generated using the diff software utility in Unix™ environment, as a revision in a source code control system, such as CVS™, Rational® ClearCase™, or the like.

In many occasions, the patch is accompanied by a human-readable description of the change, to make it easier for the reviewers to understand the patch. The reviewers can accept the proposed changes as-is, or request that certain issues be fixed, after which the developer should send the improved patch for another round of review—until the patch is finally accepted and "committed" into the main source code of the project.

BRIEF SUMMARY

One exemplary embodiment of the disclosed subject matter is a computerized apparatus having a processor, the apparatus comprising: a source code obtainer for obtaining a source code of a computer program; a patch instructions obtainer for obtaining a set of source code patches instructions, wherein a first patch instructions comprise a set of modification instructions to the source code associated with a first source code patch, wherein a second patch instructions comprise a set of modification instruction to the source code associated with a second source code patch; a source code editor configured to display to a user the source code and annotations associated with applying each source code patch simultaneously; wherein the source code editor is further configured to edit the source code in accordance with user input, wherein based on user input the first and second source code patch instructions are modified.

Another exemplary embodiment of the disclosed subject matter is computer-implemented method performed by a processor, the method comprising: obtaining a source code of a computer program; obtaining a set of source code patches instructions, wherein a first patch instructions comprise a set of modification instructions to the source code associated with a first source code patch, wherein a second patch instructions comprise a set of modification instruction to the source code associated with a second source code patch; displaying simultaneously the source code and annotations associated with applying each source code patch; and editing the source code in accordance with user input, wherein based on user input the first and second source code patch instructions are modified.

Yet another exemplary embodiment of the disclosed subject matter is a computer program product comprising: a non-transitory computer readable medium having retained thereon a computer program, wherein the computer program when executed by a processor causes the processor to: obtain a source code of a computer program; obtain a set of source code patches instructions, wherein a first patch instructions comprise a set of modification instructions to the source code associated with a first source code patch, wherein a second patch instructions comprise a set of modification instruction to the source code associated with a second source code patch; display simultaneously the source code and annotations associated with applying each source code patch; and edit the source code in accordance with user input, wherein based on user input the first and second source code patch instructions are modified.

Yet another exemplary embodiment of the disclosed subject matter is a computer program product comprising: a non-transitory computer readable medium having retained thereon a source code of a computer program, wherein the source code comprises pre-processing instructions associated with source code patches instructions; wherein the source code patches instructions comprises: a first source code patches instructions comprising a first set of modification instruction to the source code associated with a first source code patch, wherein the first source code patches instructions comprising: a first instruction to add a first source code line comprising a conditioned pre-processing command operable to always be performed comprising the first source code line; a second instruction to remove a second source code line comprising a conditioned pre-processing command operable to never be performed comprising the second source code line; a second source code patches instructions comprising a second set of modification instruction to the source code associated with a second source code patch, wherein the second source code patches instructions comprising: a third instruction to add a third source code line comprising a conditioned pre-processing command operable to always be performed comprising the third source code line; whereby a processor compiling the source code is operable to automatically apply the first and second source code patches at least by adding the first source code line, by removing the second source code line, and by adding the third source code line.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
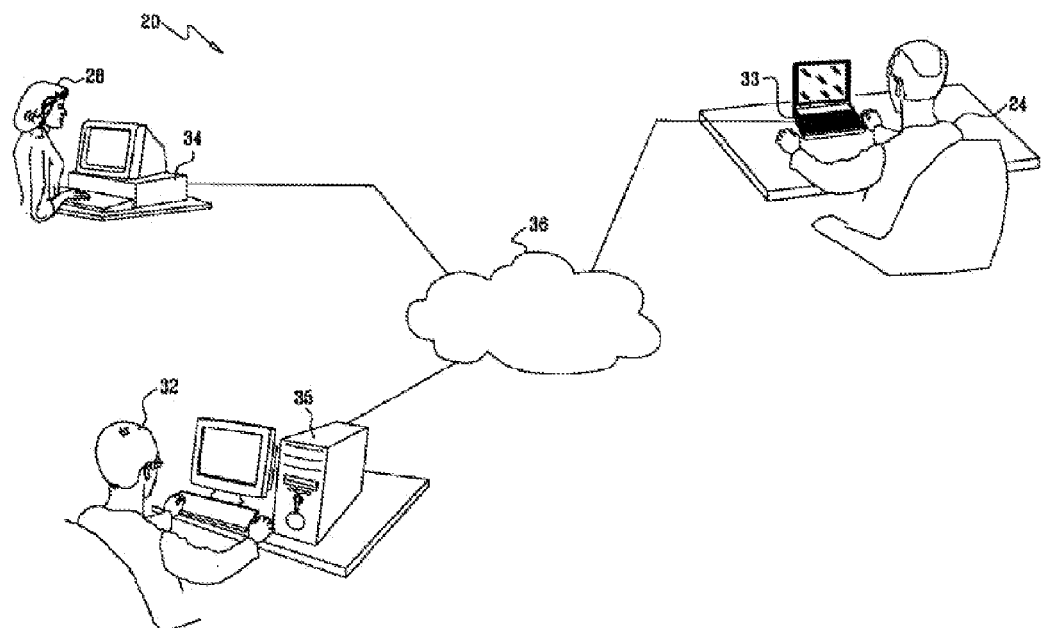
FIGS. 1A and 1B show illustrations of computerized environments, in accordance with some exemplary embodiments of the disclosed subject matter.

The disclosed subject matter is described below with reference to flowchart illustrations and/or block diagrams of methods, apparatus (systems) and computer program products according to embodiments of the subject matter. It will be understood that blocks of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, a tested processor, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transient computer-readable medium that can direct a computer or other programmable data processing apparatus to function in a particular manner, such that the instructions stored in the non-transient computer-readable medium produce an article of manufacture including instruction means which implement the function/act specified in the flowchart and/or block diagram block or blocks.

The computer program instructions may also be loaded onto a device. A computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Seriously reviewing a patch, as opposed to just rubber-stamping it, becomes very difficult as a patch becomes larger than a hundred or so lines (modified, added or deleted). When a patch grows to a thousand lines, the reviewer usually cannot understand the large patch as a whole, nor appreciate the validity of every change within. Moreover, a short description is no longer enough to describe the reasoning behind all of the changes in the patch. Such large patches are common when a large new feature is added to the code.

Generally speaking, it is easier to understand 10 patches, each with 100 lines of functionally-related code and an explanation of what this part of the code does, than to understand one big 1000-line patch which does all sorts of things.

Therefore, projects which insist on a high-quality review process, should insist that large changes be broken up into a series of smaller patches.

Typically, the changes should be split into patches in a way that after applying each patch in the sequence, the code compiles. Moreover, the changes should be split in such a way as to make it easy to explain, and understand, each patch separately. In some exemplary embodiments, the developer may add a separate description to each of the small patches.

Projects that wish to adopt the practice of splitting large patches for review, and use existing tools for this purpose, often face an obstacle. The developer needs to be able to continue to modify the code and, often, to reorganize the split to make it easier to understand, as requested by reviewers. The developer needs to do this until the code is finally accepted. In some cases, the process of iteratively developing and reviewing a modification, can involve many changes to a growing set of patches, over possibly a period of weeks or even more.

Therefore it is a technical problem dealt with by the disclosed subject matter to provide a convenient way to maintain the split of his modifications into separate patches, while still allowing him to change this split and to edit and test his code without much hassle.

There is no known method for doing this conveniently. There is no known tool for splitting of large patches into easy-to-follow pieces, and the usual tools used for manually splitting patches ("diff", "patch", and version control systems like Subversion or Git) make most of the above tasks difficult. When there are plurality of patches describing a big change, these tools force the developer to work in the context of a single patch, making it difficult for the developer to view the entire modified source code as one whole—which is often necessary for better understanding, or for making modifications that might be split across several patches.

With the existing tools, when creating or maintaining a large feature as multiple patches, developers often find themselves spending much more time on patch "bureaucracy" (applying, editing, diffing, re-applying, countless of times over and over) than they spend on actually writing code.

One technical solution is to use source code annotations to indicate a source code lines associated with a patch. In some exemplary embodiments, the annotations may be introduced into the source code file. Additionally or alternatively, the annotations may be external to the source code file and indicated to a user editing the source code using a designated editor.

Another technical solution is to use preprocessing commands as annotations within the source code file thereby upon compiling the source code file, source code lines annotated as deleted are not compiled whereas source code lines annotated as added are compiled.

One technical effect of the disclosed subject matter is to make it relatively easy to maintain and change a split into several patches, and to continue editing and using the code after the split—all in constant time even when there are many patches.

Another technical effect is viewing and editing the entire source code as a whole, not just as separate patch files or revisions.

In some exemplary embodiments, patches have a dependency order which should be maintained so as to enable the code after each patch to compile.

The disclosed subject matter provides a technical solution in which modification to the source code is arranged in a set of patches, while allowing the user to continue working on the source code directly. The disclosed subject matter further enables the user to easily tweak the split into patches (e.g., add new changes to existing patches, move changes between patches, etc.).

Referring now to FIG. 1A showing computerized environment in accordance with some exemplary embodiments of the subject matter. Computerized environment 20 comprises several developers (24, 28, 32). The developers may jointly develop a software product, such as an open source program. In some exemplary embodiments, the developers may be located remotely from one another and communicate using Computerized Network 36, such as the Internet. Each developer's computer (e.g., 33,34,35) may be connected to Computerized Network 36.

A modification made by Developer 32 may be reviewed, tested, or otherwise checked by at least one other developer, such as a manager, a review team, or the like.

Figure 1B:
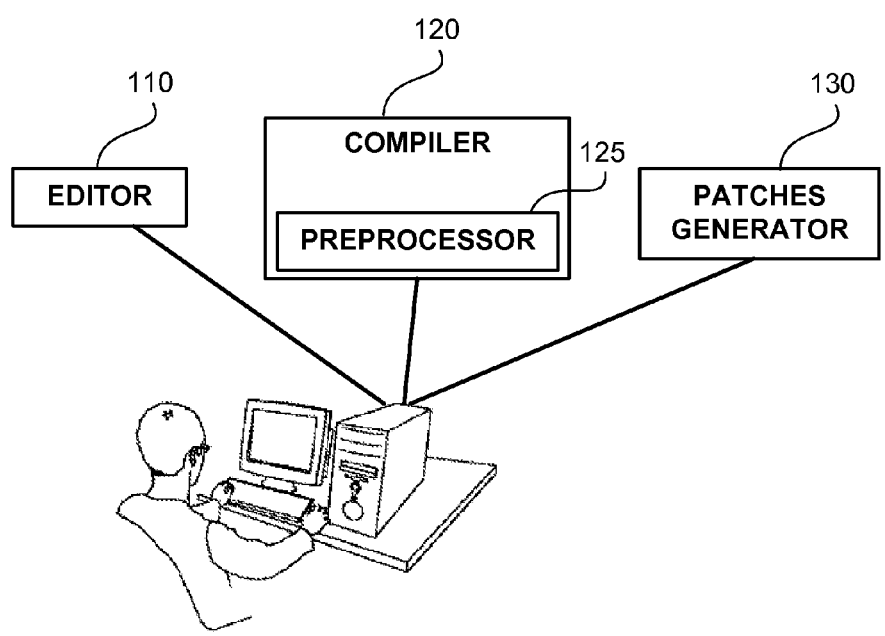

Referring now to FIG. 1B showing a computerized environment of a single developer, such as Developer 32, in accordance with some embodiments of the disclosed subject matter.

The Developer may utilize an Editor utility 110, such as implemented in software and executed by the Developer's computer (e.g., 35), to edit source code of a computer program. Editor 110 may enable the developer to indicate modifications that are associated with different patches, as is exemplified hereinbelow. In some exemplary embodiments, Editor 110 may be a general-purpose text editor. Additionally or alternatively, Editor 110 may be specifically designed and configured to assist in source code modifications associated with different patches, in accordance with the disclosed subject matter.

The Developer may utilize a Compiler 120 to compile the edited source code. Additionally or alternatively, in case the source code is provided in a computer program that does not require or support compilation, such as Perl, Compiler 120 may be an interpreter. Compiler 120 is operative to prepare the source code to be executed, either by generating an executable file or by executing the source code itself. Compiler 120 may comprise a Preprocessor 125 operative to handle preprocessing instructions as is known in the art.

The Developer may utilize a Patches Generator 130, such as implemented in software and executed by the Developer's computer (e.g., 35), to generate one or more patches based on the edited source code.

In some exemplary embodiments and unlike other systems for maintaining a patch series, the developer does not work on the patch files directly. Rather, the patch files are created automatically from annotations of the source code which define the split into patches. For example, the developer may annotate a few new lines of code, saying that these lines belong to a patch called "patch1". A few other lines are annotated as belonging to "patch2". Then, when a tool in accordance with the disclosed subject matter is executed, the two patch files "patch1" and "patch2" may be created automatically for adding these lines. When the developer wants to edit his changes, or perhaps merge the two patches or split a few lines from patch1 to a new patch3, it is as easy as editing the code and modifying the annotations.

The disclosed subject matter enables the developer to work on a single source code, and no longer needs to deal with long sequences of diff, patch, or version-control commands, between each small edit.

The disclosed subject matter will be explained using a C language code snippet. However, the disclosed subject matter is not limited to this programming language, and may be utilized on any form of source code. Consider the following code snippet:

```
int square(int n)
{
  return n*n;
}
```

In case the developer wants to create a patch that adds a copyright line in the beginning, and prints a message about the multiplication, he may do so by adding the new lines and using annotations. The modified code may be, for example:

```
#if 1 /* PATCH mychange */
/* copyright 2010 */
#endif
int square(int n)
{
  #if 1 /* PATCH mychange */
  printf("multiplying n by itself!\n");
  #endif
  return n*n;
}
```

The disclosed subject matter is demonstrated through the use of preprocessing statements. However, the disclosed subject matter is not limited to such preprocessing statements and may be utilized using any form of annotations, including comments, predetermined constructs of the pertinent programming language, predetermined text format not defined by the pertinent programming language, or the like. In some exemplary embodiments, preprocessing commands may be useful as they provide a compiler with instructions on how to handle the annotations, and thus the source code may be compiled using any form of compiler. In some exemplary embodiments, preprocessing commands may be utilized in such a manner that upon compilation, all modifications to the source code are applied. In our example, indeed "#if 1" indicates to the preprocessor that every time the code in between the #if and #endif instructions will be added, thus the added lines of the patch are added as if the patch was applied on the source code.

It will be further noted that in some exemplary embodiments the annotations may be external to the source code files and may be stored in a separate file. A specialized editor may display to the user the annotations and/or indicate the different patches using color, font, or other visible indications.

The comment "PATCH mychange" indicates that the annotation is associated with a patch named "mychange".

If in this example the developer would like to split the patch and put the printout in a separate second patch, doing this is relatively trivial—he just edits the source code and changes the second annotation:

```
#if 1 /* PATCH mychange */
/* copyright 2010 */
#endif
int square(int n)
{
  #if 1 /* PATCH secondchange */
  printf("multiplying n by itself!\n");
  #endif
  return n*n;
}
```

In some exemplary embodiments, patches may include not only additions of line to the source code, but also deletion of lines, modifications of existing lines, or the like.

Deletion may be annotated using #if 0 preprocessing command which is instructive to a preprocessor to ignore the code lines. For example consider the following code snippet:

```
#if 0 /* PATCH remove-wrong-comment */
/* multiply n by two */
#endif
return n*n;
```

In accordance with some exemplary embodiments, this means that the comment line /* multiply n by two */, which appeared in the base source code, is deleted by the "remove-wrong-comment" patch. Therefore, the code snippet after pre-processing may be: return n*n; and the other lines are not compiled.

Modification to the source code may be replacing some piece of code existing before the patch, with a different piece of code. This can be done with two separate annotations (to delete the old code, and add the new code). #if . . . #else . . . #endif preprocessing commands may also be utilized to enable describing the modification in a single annotation. For example:

```
#if 0 /* PATCH fix-wrong-comment */
    /* multiply n by two */
#else
    /* multiply n by itself */
#endif
return n*n;
```

The line in the #if 0 is the one that was removed in this patch, and the line in the #else is what replaced it. Based on the regular meaning of the preprocessing instruction and in view of the fact the "0" is considered to never be true, the preprocessor remove the line "/* multiply n by two */" and instead include the line "/* multiply n by itself */".

In some exemplary embodiments, a first patch may introduce code temporarily only to be removed by a succeeding patch. In some cases, this might be important (e.g., to get one of the intermediates in the series of patched source code to compile). Continuing our C-preprocessor based example, this annotation can look like:

```
#if 0 /* PATCH patch2..patch3 */
/* this code is added in patch2, but removed again in patch3 */
#endif
or as nested #if's:
#if 0 /* PATCH patch 3 */
#if 1 /* PATCH patch 2 */
/* this code is added in patch2, but removed again in patch3 */
#endif
#endif
```

Figure 2A:
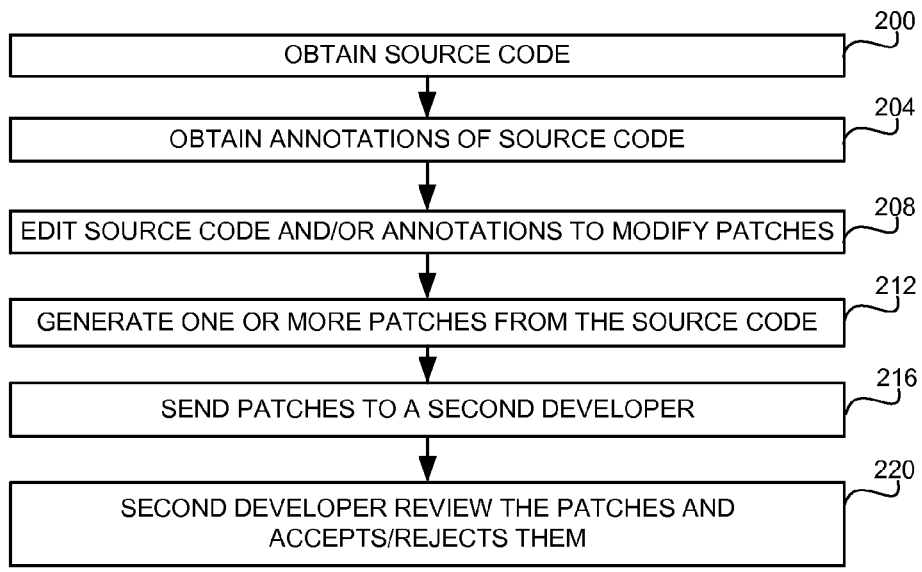
FIG. 2A-2C showing flowchart diagrams of steps in methods, in accordance with some exemplary embodiments of the disclosed subject matter.

Referring now to FIG. 2A showing a flowchart diagram of a method for collaborative code development, in accordance with some exemplary embodiments of the disclosed subject matter.

A source code is obtained in step 200 and in step 204 annotations are obtained. In some exemplary embodiments, the annotations and the source code are retained on a same digital file. Additionally or alternatively, the annotations and source code may be retained on separate files or data storages.

In step 208, a user may edit the source code and/or annotations such as using an editor. Modifications of the source code and/or annotations may affect the patches that are defined by them.

In step 212, one or more patches are generated based on the source code and annotations. In some exemplary embodiments, the patches have a defined order therebetween.

In step 216, the generated patches are then provided, such as by transmitting over a computerized network, using a removable computer media, or the like, to a second developer. In some exemplary embodiments, the second developer may in charge of reviewing patches before they are approved and applied on the project.

The second developer may, in step 220, accept some of the patches. Additionally or alternatively, the second developer may reject some of the patches upon his review. The second developer may provide the developer in charge of the patch with input regarding the patch such as indicating a bug introduced in the patch, indicating an objection to the patch (e.g., due to coding style), or the like. In some exemplary embodiments, editing the code and reviewing the patches may be an iterative process which may be concluded when the patches are accepted by the second developer.

Patches Order and Configuration File

After the developer annotates the source-code as described above, a patches generator tool, such as 130 of FIG. 1B, may be utilized to create the patches as defined by the annotated source code.

In some exemplary embodiments, patch file format refers to specific line numbers (e.g.: add this line at line 100) and/or to a specific context (e.g.: add this line after such-and-such lines). This means that patches need to be applied, and therefore created, in a specific order.

In some exemplary embodiments, patches may depend on one another. For example, if code in patch A relies on code from patch B, then patch B must by applied before applying patch A.

The order of the patches could be specified as part of the annotations, given as command-line parameter to the Patches Generator, using a separate configurations file, or the like. In some exemplary embodiments, the configuration file may comprise the patch names (i.e., as mentioned in the annotations) in an order chosen by the user. The patches may be created in that order, and should later be applied in this order.

In some exemplary embodiments, the order of the generated patches may be indicated in the name of the patches or using other meta-data thereof. For example, if in the above example "secondchange" is the second patch in the list, the generated patch file may have the name "0002-secondchange.patch".

The configuration file may also comprise information relating to the modification. For example, with respect to a certain patch any of the following information may be provided: a title of the modification, a detailed explanation of the modification, an author of the modification, a date of the modification, or the like. Additionally or alternatively, the information may be provided as part of the annotations.

In some exemplary embodiments, the Patches Generator may be provided with a list of source code files to be processed, indicating which source files will be searched for annotations, and included in the generated patches. Additionally or alternatively, the list of source code may be provided in the configuration file.

In some exemplary embodiments, the configuration file can contain additional information about the project and how to create or test patches for it.

Creating Patches Based on Annotations

Patches Generator 130 may create the patches based on the annotations in the following manner. Assuming a list of N patches (named $p_1 \ldots p_n$) given with a predetermined order (without loss of generality, the order is $p_1 \ldots p_n$), N+1 patch levels are defined. Patch-level 0 is the original source code, without any patch. Patch-level 1 is the original source code with only $p_1$ applied. Patch-level i is the original source code with patches $p_1 \ldots p_i$ applied. It readily follows from this definition that $p_i$ is the difference between patch-level i−1 and patch-level i.

The Patches Generator may create patch file i, by creating two source trees—one for patch-level i−1 and one for patch-level i—and then creating a patch from the difference (e.g., using the "diff-u" tool or another file comparison tool).

In order to create the source code at patch-level i from the annotated source code, Patches Generator may process the annotated source code, and decide which annotations should be included and which should be removed. Annotations indicated to be added in patch $p_j$ are included if and only if $j<=i$. Lines annotated as being deleted in patch $p_j$ are included if and only if $j>i$.

In some exemplary embodiments, the annotations themselves (the #if lines in the examples above) are not actually copied to the patch-level i source.

In some exemplary embodiments, Patches Generator may generate the patch file directly without first generating its patch level and predecessor patch-level by processing the source code, tracking current line-number of the predecessor patch-level and identifying annotations that need to be introduced to the patch.

Figure 2B:
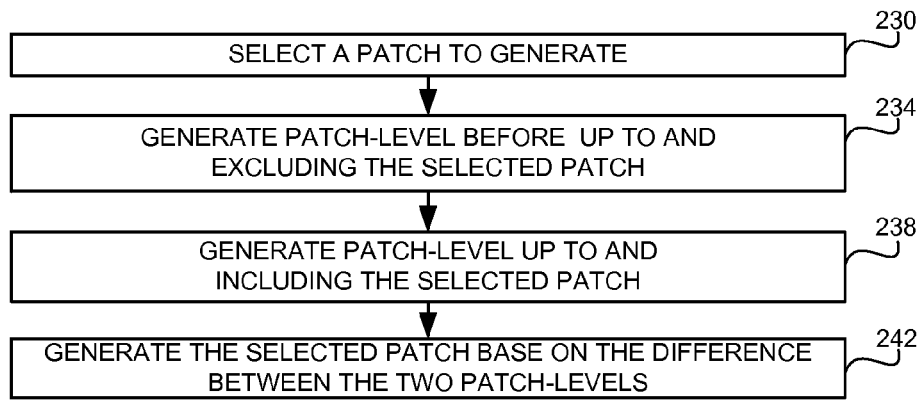

Referring now to FIG. 2B showing a flowchart diagram of method for generating a patch, in accordance with the disclosed subject matter. In step 230, a patch to be generated is selected. In some exemplary embodiments, if the selected patch is not the first patch, all patches preceding the selected patch may be generated as well. In step 234, a first patch level up to and excluding the selected patch is generated. In step 238, a second patch level up to and including the selected patch is generated. In step 242, the selected patch is generated based on a difference between the first and second patch levels.

Creating Revisions

In some exemplary embodiments, consecutive patch-levels of the source code can be automatically checked-in as a branch in a source code repository. This can be useful for projects where the patches are supposed to be checked-in directly, rather than being submitted as actual patch files. For example, projects using a distributed revision control system, such as Git, may have such a policy. In some exemplary embodiments, this can used for the convenience of reviewers who would like to run their favorite comparison tool themselves, rather than rely on the developer to send them the output of some comparison tool.

Verifying the Base

In some exemplary embodiments, the annotated source code is based on the original project's source code (i.e., the base). Every change to the base is supposed to be provided by a patch, such as using an annotation scheme in accordance with the disclosed subject matter.

In some exemplary embodiments, in order to avoid mistakenly modifying the code without proper annotation, automatic process may recognize such mistake and provide an alert thereof. A verifying module may generate patch-level 0, such as using Patches Generator 130. The generated source code is the base upon which the modifications are made. The generated source code may be compared with a pre-existing base version, such as a predetermined revision in a version-control system, a version saved on a different computer or folder, or the like, to ensure that the patches are configured to be applied on the pre-existing base version.

In some exemplary embodiments, in case there are differences, they may be shown to the developer, such as similarly to an output provided by a diff tool, so as to indicate which modifications were made to the base without proper annotations. The developer may then modify the source code to include the missing annotations.

This capability may be useful when adding annotations in accordance with the disclosed subject matter to some modifications that were done originally without the use of such annotations. In case the user forgot to annotate some of these modifications, the base-verification step may remind him of this oversight. In some exemplary embodiments, instead of just warning about unannotated changes, the missing annotations can be added automatically: All unannotated added or deleted code will be annotated as belonging to a target patch. The target patch may be a new patch, a patch selected by the user, or the like.

Additional Functions

In some exemplary embodiments, an automated process may verify that after each patch is applied the source code compiles correctly. In some exemplary embodiments, the automatic process may generate all patch levels and for each such patch level attempt to compile it. In some exemplary embodiments, compilation error messages are associated with a line number. In order for the line number to be useful with respect to the source code itself (as opposed to the pertinent patch level), line numbers may be modified to refer to the relevant lines in the source code. Additionally or alternatively, patch levels may be generated in a manner that does not modify the line numbering, such as by not deleting lines, but rather replacing deleted lines with blank lines.

In some exemplary embodiments, other automatic verifications may be performed, such as executing a projected-specified coding style checker, or the like.

Figure 2C:
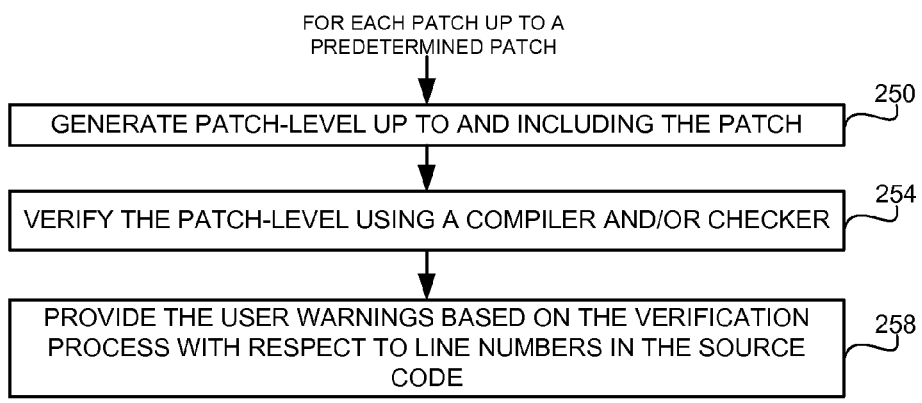

Referring now to FIG. 2C showing a flowchart diagram of a method for checking the patches, in accordance with the disclosed subject matter. For each patch up to a predetermined patch, such as the last patch or a patch selected by the developer, steps 250-258 may be performed. In step 250, a patch level up to and including the patch is generated. In some exemplary embodiments, the patch level may be generated in such a manner that does not change a line number of a line in the source code such as by replacing lines to be deleted with blank lines. In step 254, the patch level is verified for a desired property, such as for example compiling (e.g., using a compiler), being in line with coding style (e.g., by executing a coding style checker), or the like. In step 258 output is provided to the user such as indicating compilation error in specific code lines. In some exemplary embodiments, in case code lines are modified in generation of the patch level, a shifted code line may be computed and displayed to the user to indicate a is relevant code line in the original source code instead of in the patch level.

In some exemplary embodiments, a re-basing module may be configured to modify the annotations so as to apply all patches up to a predetermined patch. Thereby, the base version is modified to be the source code after applying all patches up to the predetermined patch. In some exemplary embodiments, this can be used after these patches have been accepted into the code.

In some exemplary embodiments, when only some of the patches have been applied to the base project, and the developer wishes to rebase the remaining unapplied patches to the latest official base, it can be useful to have a patch which includes the unapplied modifications together with their annotations. This can be done, for example, in the same manner described above for generating patches, except that the annotation lines themselves are not deleted but rather left behind.

Figure 3:
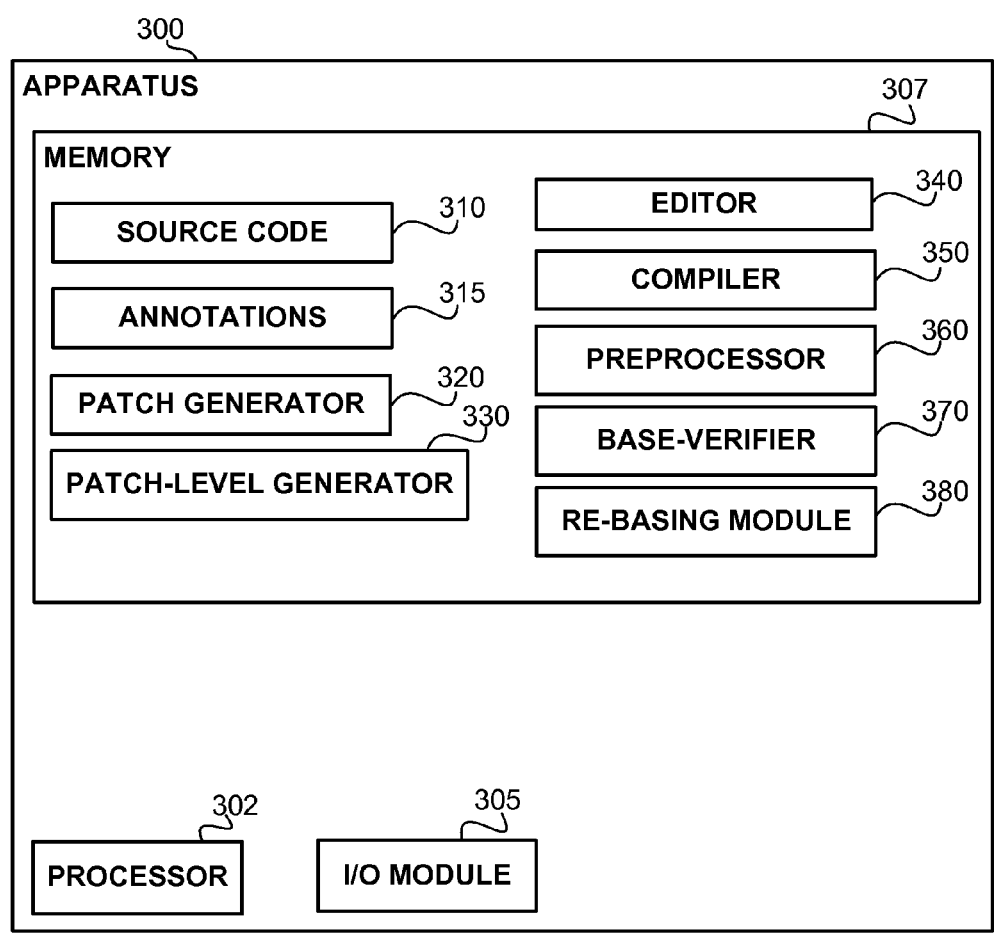
FIG. 3 shows a block diagram of components of a computerized apparatus, in accordance with some exemplary embodiments of the disclosed subject matter.

Referring now to FIG. 3 showing a block diagram of components of a computerized apparatus, in accordance with some exemplary embodiments of the disclosed subject matter.

In some exemplary embodiments, Apparatus 300 may comprise a Processor 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents.

In some exemplary embodiments, Apparatus 300 may comprise an Input/Output (I/O) Module 305 such as a receiver, transmitter, transceiver, modem, an input device, an output device or the like. In some exemplary embodiments, I/O Module 305 is utilized to connect to an I/O device for providing input by or output to a human user. I/O Module 305 may be operatively connected to a display, to a pointing device, a keyboard, or the like. It will however be appreciated that the system can operate without human operation.

In some exemplary embodiments, Apparatus 300 may comprise a Memory 307. Memory 307 may be computerized memory, such as persistent or volatile, or a combination thereof. For example, Memory 307 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, Memory 307 comprises several memory devices, such as for example a RAM and a hard disk. In some exemplary embodiments, Memory 307 may retain program code operative to cause Processor 302 to perform acts associated with any of the steps shown in FIG. 2A-2C or the like.

The components detailed below may be implemented as one or more sets of interrelated computer instructions, executed for example by Processor 302 or by another processor. The components may be arranged as one or more executable files, dynamic libraries, static libraries, methods, functions, services, or the like, programmed in any programming language and under any computing environment.

In some exemplary embodiments, Patch Generator 320, such as 130 of FIG. 1B, may be configured to generate one or more patches based on Source Code 310 and Annotations 315. In some exemplary embodiments, Patch Generator 320 may utilize Patch-Level Generator 330 to generate patch levels useful to generating the patch.

In some exemplary embodiments, Editor 340, such as 110 of FIG. 1B, may be a source code editor in accordance with the disclosed subject matter. Editor 340 may be a general-purpose code editor or a designated editor to handle Annotations 315. Compiler 350, such as 120 of FIG. 1B, may be configured to compile the source code and optionally use Preprocessor 360, such as 125 of FIG. 1B, to process preprocessing instructions such as #if instructions before compiling the source code.

In some exemplary embodiments, a Base Verifier 370 may be configured to check whether the base is as expected. Additionally or alternatively, in case Base Verifier 370 determines that the base is not as expected, Base Verifier 370 may generate a patch to modify the base into the version that the Source Code 310 and Annotations 315 build upon.

In some exemplary embodiments, Re-Basing Module 380 may be configured to change the base from which Source Code 310 and Annotations 315 build upon, as was detailed hereinabove.

Editor

In some exemplary embodiments, a general-purpose text editor or source-code editor may be utilized to view and edit the source code.

Additionally or alternatively, a designated editor may be devised in accordance with the disclosed subject matter.

In some exemplary embodiments, the designated editor can show annotations in a less cluttered way (e.g., with color-coding or margin notes instead of actually showing the #if lines). The user can tell the editor which patch he's currently working on, and any modification (addition, deletion or change) can be automatically annotated by the editor, without the user having to type them in.

In some exemplary embodiments, the user can ask the editor to hide or "fold" certain patches, or all patches after a certain patch.

Figure 4:
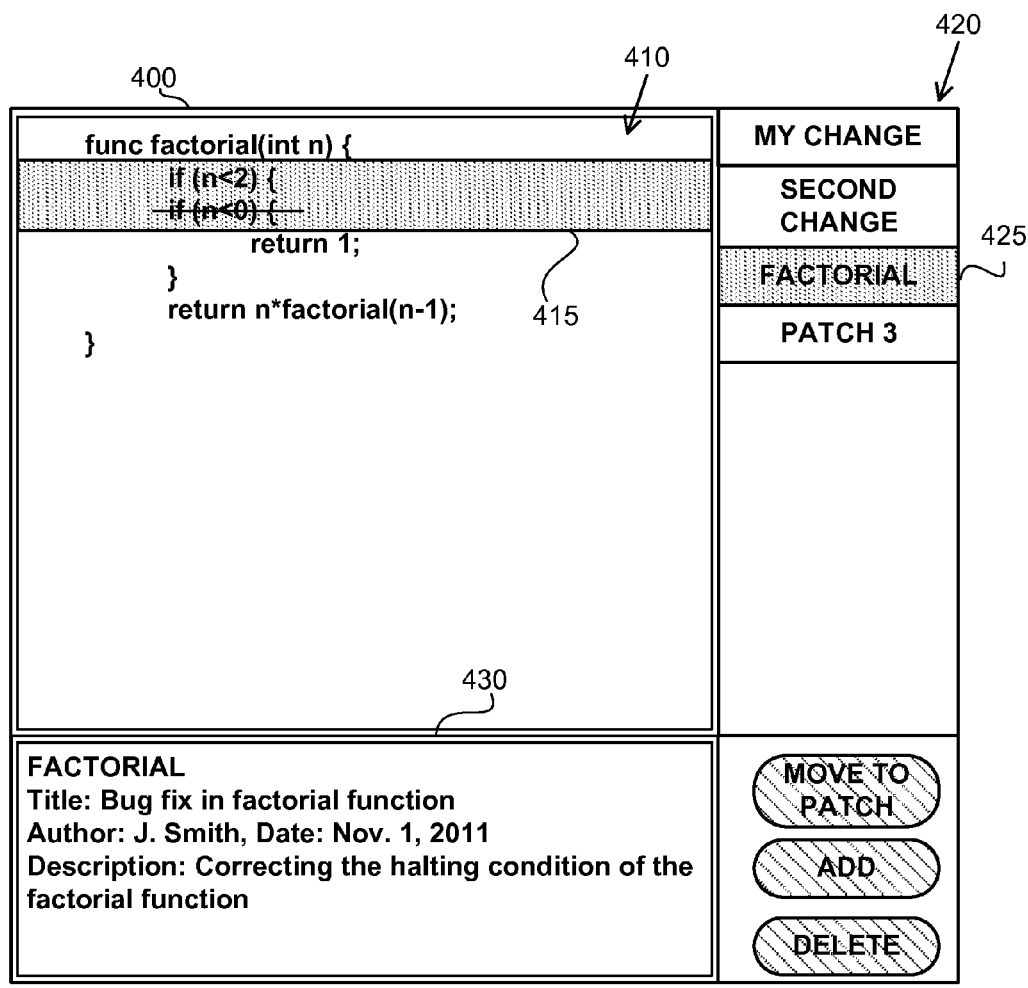
FIG. 4 shows an illustration of an editor, in accordance with exemplary embodiments of the disclosed subject matter.

Referring now to FIG. 4 showing an illustration of an editor, in accordance with exemplary embodiments of the disclosed subject matter.

Screen 400 shows a Graphical User Interface (GUI) of an editor in accordance with the disclosed subject matter. Editing pane 410 may be configured to display the source code and annotations. In some exemplary embodiments, the source code is displayed in such a manner indicative of the annotations, such as using different coloring or text style for added, removed or modified text. For example Factorial patch 425 which introduced a line modification to the factorial function, may be displayed to the user using a different coloring for modification section 415. Additionally or alternatively, removed text is displayed using a strikethrough line. Other graphical notations may be used in accordance with user preferences.

In some exemplary embodiments, the editor may display a version of the base line up to an excluding the selected patch (e.g. Factorial patch 425) and indicate modifications provided by the patch itself. Additionally or alternatively, all modifications may be displayed over the base version using different coloring or other graphical notations to indicate which modification is associated with which patch.

Patch List 420 may be utilized to display all patches. Patch List 420 may indicate an order of the patches. The user may use GUI buttons to add new patches, delete existing patches and move modifications from a first patch to a different patch.

Patch Metadata Editor 430 may display metadata associated with a selected patch. In some exemplary embodiments, the user may edit the metadata using Patch Metadata Editor 430.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computerized apparatus having a processor, the apparatus comprising:
    a source code obtainer for obtaining a source code of a computer program;
    a patch generator for splitting a change of the source code into a set of patches having an ordering, such that after applying to the source code, in accordance with the ordering, any patch in the set of patches and its preceding patches, the source code compiles successfully, and wherein each patch comprises less than a predetermined number of lines; and
    a source code editor configured to simultaneously display to a user: a listing of the set of patches and the source code, such that when the user selects a patch from the listing, the source code is presented with changes caused by applying the set of modification instructions associated with the patch,
    wherein said source code editor is further configured to edit the source code in accordance with user input, wherein based on user input at least one of the set of patches is automatically modified.

2. The computerized apparatus of claim 1, wherein said source code editor is configured to modify the patches instructions in the following manner: a modification instruction associated with a first patch is modified to be associated with a second patch.

3. The computerized apparatus of claim 1, wherein in response to an input from the user, said source code editor is configured to update the source code so as to simultaneously modify a first version of the source code and a second version of the source code, wherein the first version of the source code is the source code after applying a first patch thereon; and wherein the second version of the source code is the first version of the source code after applying a second patch thereon.

4. The computerized apparatus of claim 1, wherein a second patch is applicable on the source code after a first patch is first applied on the source code.

5. The computerized apparatus of claim 1, wherein the source code comprising annotations indicative of the set of patches, wherein said patch instructions obtainer is configured to obtain the set of patches from the annotations in the source code.

6. The computerized apparatus of claim 5, wherein the annotations are provided as comments in the source code, whereby the source code can be compiled.

7. The computerized apparatus of claim 5, wherein the annotations are provided as pre-processing instructions in the source code, whereby the source code can be compiled.

8. The computerized apparatus of claim 7, wherein the pre-processing instructions are configured to cause a preprocessor to apply all patches, whereby upon compilation of the source code, a version having all patches applied is compiled.

9. The computerized apparatus of claim 5, further comprising a patch applier configured to apply a predetermined patch by applying all patches that the predetermined patch is dependent on.

10. The computerized apparatus of claim 9, wherein said patch applier is configured to modify pre-processing instructions so as to apply the all patches that the predetermined patch is dependent on and the predetermined patch; and wherein said patch applier is configured to modify the pre-processing instructions so as to not apply all other patches.

11. The computerized apparatus of claim 1, wherein said patch generator is configured to obtain an ordering of the patches, and wherein said patches generator is configured to generate a predetermined patch by:
   generating a first patch level by applying patches up to the predetermined patch, excluding the predetermined patch;
   generating a second patch level by applying patches up to and including the predetermined patch; and
   generating the predetermined patch based on a difference between the first patch level and the second patch level.

12. A computer-implemented method performed by a processor, the method comprising:
   obtaining a source code of a computer program;
   generating a set of patches having an ordering by splitting a change of the source code, wherein each patch comprises a set of modification instructions to the source code, and wherein after applying to the source code, in accordance with the ordering, any patch in the set of patches and its preceding patches, the source code compiles successfully, and wherein each patch comprises less than a predetermined number of lines;
   displaying simultaneously: a listing of the set of patches and the source code, such that when a user selects a patch from the listing, the source code is presented with changes caused by applying the set of modification instructions associated with the patch; and
   editing the source code in accordance with user input, wherein based on user input at least one of the set of patches is automatically modified.

13. The computer-implemented method of claim 12, wherein said editing comprising: modifying an instruction associated with a first patch to be associated with a second patch.

14. The computer-implemented method of claim 12, wherein the source code comprises annotations indicative of the modification instructions, wherein said obtaining the set of patches comprises obtaining the modification instructions from the annotations in the source code.

15. The computer-implemented method of claim 14, wherein the annotations are provided as comments in the source code, whereby the source code can be compiled.

16. The computer-implemented method of claim 14, wherein the annotations are provided as pre-processing instructions in the source code, whereby the source code can be compiled.

17. The computer-implemented method of claim 16, wherein the pre-processing instructions are configured to cause a pre-processor to apply all patches, whereby upon compilation of the source code, a version having all patches applied is compiled.

18. The computer-implemented method of claim 12, wherein generating a predetermined patch of the set of patches comprises:
   generating a first patch level by applying patches up to the predetermined patch, excluding the predetermined patch;
   generating a second patch level by applying patches up to and including the predetermined patch; and
   generating the predetermined patch based on a difference between the first patch level and the second patch level.

19. A computer program product comprising:
   a non-transitory computer readable medium having retained thereon a computer program, wherein the computer program when executed by a processor causes the processor to:
      obtain a source code of a computer program;
      generate a set of patch instructions having an ordering by splitting a change of the source code, wherein each patch comprises a set of modification instructions to the source code, and wherein after applying to the source code, in accordance with the ordering, any patch in the set of patches and its preceding patches, the source code compiles successfully, and wherein each patch comprises less than a predetermined number of lines;
      display simultaneously a listing of the set of patches and the source code, such that when a user selects a patch from the listing, the source code is presented with changes caused by applying the set of modification instructions associated with the patch; and
      edit the source code in accordance with user input, wherein based on user input at least one of the set of patches is automatically modified.

20. A computer program product comprising:
   a non-transitory computer readable medium having retained thereon a source code of a computer program, wherein the source code comprises pre-processing instructions associated with patches instructions;
   wherein the patches instructions comprise:
      a first patch comprising a first set of modification instructions to the source code, wherein the first set of modification instructions comprising:
         a first instruction to add a first source code line comprising a conditioned pre-processing command operable to always be performed comprising the first source code line; and a second instruction to remove a second source code line comprising a conditioned pre-processing command operable to never be performed comprising the second source code line; and
      a second patches comprising a second set of modification instruction t, wherein the second set of modification instructions comprising:
         a third instruction to add a third source code line comprising a conditioned pre-processing command operable to always be performed comprising the third source code line,
   wherein the first patch and the second patch are generated by splitting a change of the source code, and wherein after applying to the source code, in accordance with the ordering, the first patch or the first patch and second patch, the source code compiles successfully, and wherein the first patch and the second patch comprise less than a predetermined number of lines,
   whereby a processor compiling the source code is operable to automatically apply the first patch and the second patch at least by adding the first source code line, by removing the second source code line, and by adding the third source code line.

* * * * *